(12) United States Patent
Huang et al.

(10) Patent No.: US 11,516,874 B2
(45) Date of Patent: Nov. 29, 2022

(54) INFORMATION TRANSMISSION METHOD AND DEVICE (71) Applicant: ZTE Corporation, Shenzhen (CN)

(72) Inventors: Ying Huang, Shenzhen (CN); Lin Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/734,032

(22) PCT Filed: May 13, 2019

(86) PCT No.: PCT/CN2019/086677
§ 371 (c)(1),
(2) Date: Dec. 1, 2020

(87) PCT Pub. No.: WO2019/242428
PCT Pub. Date: Dec. 26, 2019

(65) Prior Publication Data
US 2021/0219374 A1  Jul. 15, 2021

(30) Foreign Application Priority Data
Jun. 21, 2018  (CN) .......................... 201810646835.2

(51) Int. Cl.
*H04W 76/27* (2018.01)
*H04W 76/11* (2018.01)
*H04W 88/14* (2009.01)
*H04W 92/20* (2009.01)

(52) U.S. Cl.
CPC ............ *H04W 76/27* (2018.02); *H04W 76/11* (2018.02); *H04W 88/14* (2013.01); *H04W 92/20* (2013.01)

(58) Field of Classification Search
CPC ..... H04W 76/27; H04W 76/11; H04W 88/14; H04W 92/20

USPC .......................................................... 370/329
See application file for complete search history.

(56) References Cited

U.S. PATENT DOCUMENTS

| 10,785,699 B2* | 9/2020 | Sirotkin | ............... H04B 7/2606 |
| 2017/0188400 A1 | 6/2017 | Tian | |
| 2017/0238305 A1* | 8/2017 | Chen | ..................... H04W 52/38 |
| | | | 370/311 |
| 2019/0159277 A1* | 5/2019 | Zhu | ........................ H04W 92/12 |

(Continued)

FOREIGN PATENT DOCUMENTS

| CN | 106572480 A | 4/2017 |
| WO | 2017095809 A1 | 6/2017 |

OTHER PUBLICATIONS

International Search Report for corresponding application PCT/CN2019/086677 filed May 13, 2019; dated Aug. 15, 2019.

(Continued)

*Primary Examiner* — Mong-Thuy T Tran (74) *Attorney, Agent, or Firm* — Cantor Colburn LLP (57) ABSTRACT

Provided are an information transmission method and device. The method comprises: an IAB node sends an F1 message to a base station, and forwards the F1 message to an IAB donor via the base station. In the present disclosure, the problem of lacking an IAB control plane information transmission scheme applicable to the NR is solved, and the forwarding of control plane information between an IAB node and an IAB donor is realized timely and accurately.

14 Claims, 3 Drawing Sheets an IAB node determines an F1 message to be transmitted — S302 the IAB node sends the F1 message to a base station, wherein the F1 message is forwarded to an IAB donor via the base station — S304

(56) References Cited

U.S. PATENT DOCUMENTS

| | | | | |
|---|---|---|---|---|
| 2019/0215055 | A1* | 7/2019 | Majmundar | H04W 40/04 |
| 2019/0223078 | A1* | 7/2019 | Sirotkin | H04B 7/155 |
| 2019/0394825 | A1* | 12/2019 | Byun | H04W 72/042 |
| 2020/0007223 | A1* | 1/2020 | Zhu | H04W 16/26 |
| 2020/0344843 | A1* | 10/2020 | Zhu | H04W 40/22 |
| 2020/0351971 | A1* | 11/2020 | Fiorani | H04B 17/318 |
| 2021/0007011 | A1* | 1/2021 | Zhu | H04B 7/15542 |
| 2021/0051579 | A1* | 2/2021 | Luo | H04W 88/14 |
| 2021/0068177 | A1* | 3/2021 | Liu | H04L 5/00 |
| 2021/0076368 | A1* | 3/2021 | Malkamäki | H04W 4/20 |
| 2021/0274394 | A1* | 9/2021 | Luo | H04W 36/0016 |

OTHER PUBLICATIONS

AT&T, "On backhauling of F1-U and F1-C for IAM with L2 relaying", 3GPP TSG-RAN WG3 #99bis, Sanya China, Apr. 16, 2018, R3-182297.

European Search Report for corresponding application EP 19822514; Report dated Jun. 22, 2021.

KDDI Corporation AT&T, "IAB with NSA Operation", 3GPP TSG RAN WG3 #104, Reno USA, May 13, 2019, R3-192643.

KDDI Corporation Kyocera, "Consideration on NSA operation in architectures, 1a, 1b and 2a", 3GPP TSG RAN WG3 #100, Busan, Korea May 21, 2018, R3-182586.

KDDI Corporation, "IAB Architechture Consideration on SA/NSA and LTE access link aspects", 3GPP TSG RAN WG3 #99, Atens Greece, Feb. 26, 2018, R3-181422.

Qualcomm Inc, "IAB NSA", 3GPP TSG RAN WG3 Meeting #100, May 21-25, 2018, R3-183563.

ZTE, "Discussion on Control Plane Protocol for IAB", 3GPP TSG-RAN WG3 Meeting #100, Busan Korea May 21-25, 2018, R3-182792.

* cited by examiner

INFORMATION TRANSMISSION METHOD AND DEVICE

TECHNICAL FIELD

The present disclosure relates to the field of communications, and in particular, to an information transmission method and device.

BACKGROUND

Figure 1:
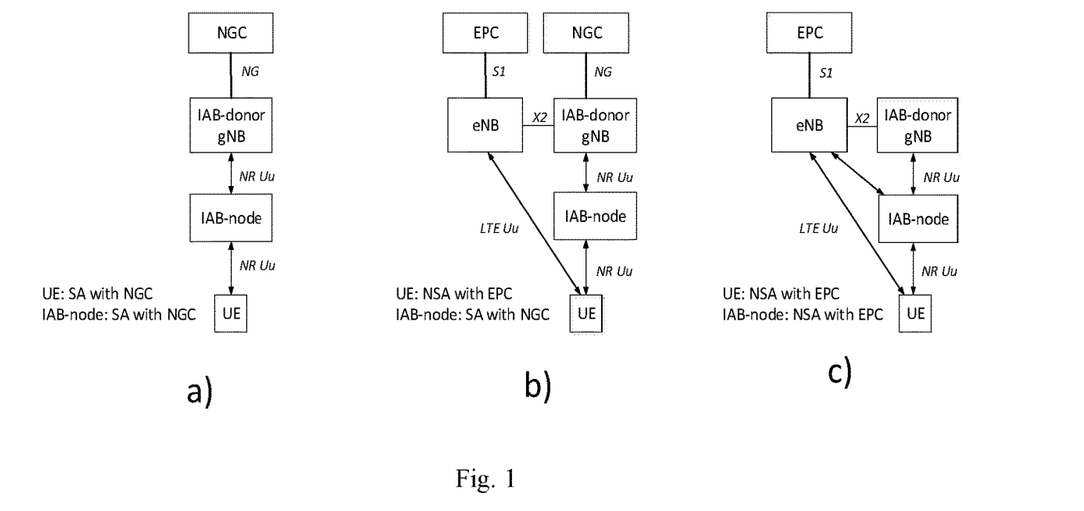
FIG. 1 is a schematic diagram of a standalone or non-standalone deployment scenario of an IAB according to the related art.

In the related art, compared with a long term evolution (LTE) system, the new radio (NR) has a larger available bandwidth, and a massive MIMO and a multi-beam, which makes the research and application of the integrated access backhaul (IAB) links possible. By means of wireless backhaul links and relay links, a dense NR cell network can be deployed more flexibly, and the dense deployment of transmission networks does not need to be increased correspondingly. An access node supporting wireless access of a UE and performing wireless backhaul on a user plane or a control plane data packet is referred to as an IAB node, which may have a distributed unit (DU) or a logical function of a gNB, and the IAB node also has a logical function of a mobile terminal (MT) (also referred to as a UE logical function). In addition, the access node providing the wireless backhaul function for the IAB node, so that the UE connects to the core network, is referred to as an IAB donor. The IAB donor may have the functions of DU and/or CU or gNB. An IAB node (which may also be referred to as a child IAB node) may access another IAB node (which may also be referred to as a parent IAB node) or an IAB donor via an air interface. Data packets of the user plane or the control plane can be transmitted between the access nodes via the wireless backhaul link. The access link and the backhaul link may use the same or different carrier frequencies. In addition, the user-plane or control-plane packets may be transmitted over a multi-hop relay backhaul link between the access node and the core network element. Supporting CU/DU split deployment is an important technical feature in the NR, that is, the gNB includes CU and DU logic functions, and therefore it is also necessary to support the IAB function in a CU/DU split deployment scenario. The CU may further include control plane (or referred to as CU-CP) and user plane (or referred to as CU-UP) logic functions. In addition, the IAB needs to consider standalone and non standalone deployment scenarios. FIG. 1 is a schematic diagram of the standalone and non standalone deployment scenario of the IAB in the related art. As shown in FIG. 1, a) is a standalone deployment scenario, and b) and c) are non standalone deployment scenarios.

For the problem in the related art that there is no IAB control plane information transmission scheme applicable to the new radio, there is no effective solution at present.

SUMMARY

Embodiments of the present disclosure provide an information transmission method and device, so as to at least solve the problem in the related art that an IAB control plane information transmission scheme for the new radio is lacking.

According to an embodiment of the present disclosure, provided is an information transmission method, which comprises: an IAB node sends an F1 message to a base station, wherein the F1 message is forwarded to an IAB donor via the base station.

According to another embodiment of the present disclosure, an information transmission method is also provided, and the method comprises: a base station receives an F1 message sent by an IAB node; and the base station sends the F1 message to the IAB donor through an X2 message.

According to another embodiment of the present disclosure, an information transmission method is also provided, the method comprises: an IAB donor sends an F1 message to a base station through an X2 message, wherein the F1 message is sent to an IAB node via the base station.

According to another embodiment of the present disclosure, an information transmission method is also provided, the method comprises: a base station receives an F1 message sent by an IAB donor through an X2 message; and the base station sends the F1 message to the IAB node.

According to another embodiment of the present disclosure, an information transmission method is also provided, and the method comprises: an IAB node carries an F1 message in a second RRC message; the second RRC message is carried in a third RRC message; and sends the third RRC message to a base station, and the second RRC message is sent to the IAB donor via the base station.

According to another embodiment of the present disclosure, an information transmission method is also provided, and the method comprises: a base station receives a third RRC message sent by an IAB node, wherein the third RRC message carries a second RRC message, and the second RRC message carries an F1 message; and the second RRC message is sent to the IAB donor through an X2 message.

According to another embodiment of the present disclosure, an information transmission method is also provided, and the method comprises: an IAB donor sends a second RRC message to a base station through an X2 message, wherein the second RRC message carries an F1 message, and a third RRC message carrying the second RRC message is sent to an IAB node via the base station.

According to another embodiment of the present disclosure, an information transmission method is also provided, and the method comprises: a base station receives a second RRC message sent by an IAB donor through an X2 message, wherein the second RRC message carries an F1 message; and the base station sends a third RRC message to the IAB node, wherein the third RRC message carries the second RRC message.

According to another embodiment of the present disclosure, an information transmission device is further provided, and the device comprises: a first sending module, configured to send an F1 message to a base station, wherein the F1 message is forwarded to the IAB donor via the base station.

According to another embodiment of the present disclosure, also provided is an information transmission device, which comprises: a second receiving module, configured to receive an F1 message sent by an IAB node; and a second sending module, configured to send the F1 message to the IAB donor through an X2 message.

According to another embodiment of the present disclosure, also provided is an information transmission device, which comprises: a third sending module, configured to send an F1 message to a base station through an X2 message, wherein the F1 message is sent to an IAB node via the base station.

According to another embodiment of the present disclosure, also provided is an information transmission device, which comprises: a fourth receiving module, configured to receive an F1 message sent by an IAB donor through an X2 message; and a fourth sending component, configured to send the F1 message to the IAB node.

According to another embodiment of the present disclosure, also provided is an information transmission device, which comprises: a fifth processing module, configured to carry an F1 message in a second RRC message, and carry the second RRC message in a third RRC message; and a fifth sending module, configured to send the third RRC message to a base station, and send the second RRC message to the IAB donor via the base station.

According to another embodiment of the present disclosure, an information transmission device is also provided, and the device comprises: a sixth receiving module, configured to receive a third RRC message sent by an IAB node, wherein the third RRC message carries a second RRC message, and the second RRC message carries an F1 message; and a sixth sending module, configured to send the second RRC message to the IAB donor through an X2 message.

According to another embodiment of the present disclosure, also provided is an information transmission device, which comprises: a seventh sending module, configured to send a second RRC message to a base station through an X2 message, wherein the second RRC message carries an F1 message, and a third RRC message carrying the second RRC message is sent to an LAB node via the base station.

According to another embodiment of the present disclosure, also provided is an information transmission device, which comprises: an eighth receiving module, configured to receive, through an X2 message, a second RRC message sent by an IAB donor, wherein the second RRC message carries an F1 message; and an eighth sending module, configured to send a third RRC message to the IAB node, wherein the third RRC message carries the second RRC message.

According to another embodiment of the present disclosure, a storage medium is also provided. The storage medium stores a computer program, wherein the computer program is configured to run to execute the steps in any one of the above method embodiments.

According to another embodiment of the present disclosure, an electronic device is also provide, and the electronic device comprises a memory and a processor, wherein the memory stores a computer program, and the processor is configured to run the computer program so as to execute the steps in any one of the above method embodiments.

By means of the above embodiments of the present disclosure, an IAB node sends an F1 message to a base station, and the F1 message is forwarded to an IAB donor via the base station. The problem of lacking an IAB control plane information transmission scheme applicable to the NR is solved, and the forwarding of control plane information between an IAB node and an IAB donor is realized timely and accurately.

BRIEF DESCRIPTION OF THE DRAWINGS

Drawings, provided for further understanding of the present disclosure and forming a part of the present disclosure, are used to explain the present disclosure together with embodiments of the present disclosure rather than to limit the present disclosure. In the drawings.

DETAILED DESCRIPTION OF THE EMULSIONS

The present disclosure will be described below with reference to the drawings and embodiments in detail. It is important to note that the embodiments of the present disclosure and the characteristics in the embodiments can be combined under the condition of no conflicts.

It should be noted that the terms "first" and "second" in the description, claims, and accompanying drawings of the present disclosure are used to distinguish similar objects, and are not necessarily used to describe a specific sequence or order.

Embodiment 1

A mobile communication network (including, but not limited to a 5G mobile communication network) is provided by the present embodiment. The network architecture may include a network side device (for example, a base station) and a terminal. Provided in the present embodiment is an information transmission method performed on the above network architecture. It should be noted that the operating environment of the described information transmission method provided in the embodiment of the present disclosure is not limited to the above described network architecture.

Figure 2:
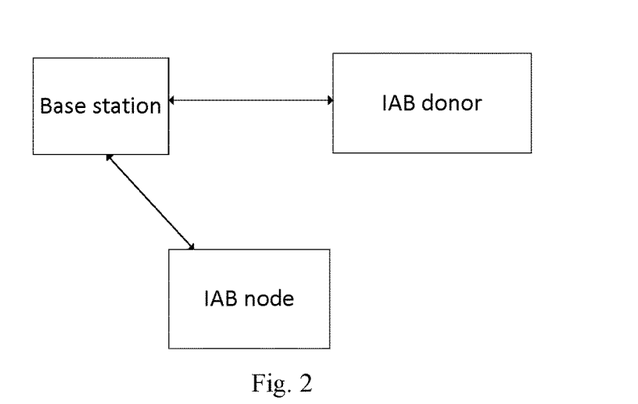
FIG. 2 is a schematic diagram of network architecture according to the present disclosure.

The embodiments of the present disclosure can run on the network architecture shown in FIG. 2, and FIG. 2 is a schematic diagram of network architecture according to the embodiments of the present disclosure. As shown in FIG. 2, the network architecture includes: A, an IAB node; B, a base station; C, an IAB donor.

Figure 3:
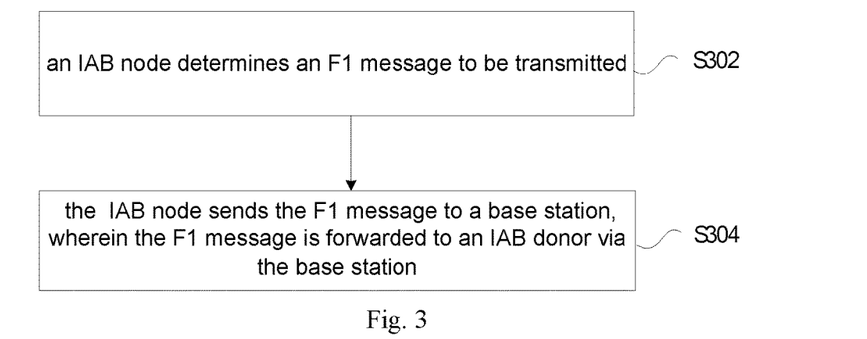
FIG. 3 is a flowchart of an information transmission method according to an embodiment of the present disclosure.

Provided in the present embodiment is an information transmission method performed on the above described network architecture. FIG. 3 is a flowchart of an information transmission method according to an embodiment of the present disclosure. As shown in FIG. 3, the flow may include the following steps:

Step S302, an IAB node determines an F1 message to be transmitted; and

Step S304: the IAB node sends the F1 message to a base station, wherein the F1 message is forwarded to an IAB donor via the base station.

By means of the described steps, an IAB node sends an F1 message to a base station, and the F1 message is forwarded to an IAB donor via the base station. The present invention solves the problem in the related art of lacking an IAB control plane information transmission scheme applicable to NR, and timely and accurately realizes the forwarding of control plane information between an IAB node and an IAB donor.

In an embodiment, the execution order of step S302 and step S304 may be interchanged, that is, step S304 may be executed first, and then step S302 is executed.

In an embodiment, the step of the IAB node sending the F1 message to the base station comprises at least one of the following: the IAB node carries the F1 message in a first RRC message, and sends the first RRC message to the base station; the IAB node sends an F1 message to the base station via a signaling radio bearer (SRB).

In an embodiment, at least one of the F1 message and the first RRC message satisfies the following features: comprising at least one piece of the following information: node identification information about a source node and node identification information about a target node.

In an embodiment, the node identification information is used for identifying one of the followings: a distributed unit (Distributed Unit) DU used for identifying the IAB node; a base station part for identifying an IAB node; a distributed unit DU of the IAB donor; a centralized Unit (CU) of the IAB donor; a base station part of the IAB donor.

In an embodiment, the node identification information comprises one of the following: a base station distributed unit identifier (gNB-DU ID), a base station identifier, a DU identifier, a CU identifier, a cell identifier, a physical cell identifier (PCI), an Internet protocol address (IP) address, and a newly defined identifier.

In an embodiment, the node identification information is used for identifying the following information: used for identifying the mobile terminal part MT part of the IAB node.

The solution of node identification information recorded in the foregoing four optional embodiments is applicable to other embodiments of the present disclosure.

In an embodiment, the node identification information comprises one of the following: a cell radio network temporary identifier (C-RNTI); C-RNTI+cell identity; C-RNTI+base station identity; C-RNTI+DU identification; C-RNTI+CU identity; F1 application protocol F1AP ID (F1 Application Protocol); X2 application protocol X2 AP ID (X2 Application Protocol); GTP TEID (GPRS Tunnel Protocol Tunnel Endpoint Identity); a newly defined identifier.

According to another embodiment of the present disclosure, also provided is an information transmission method, which comprises the following steps:

Step 1, a base station receives an F1 message sent by an IAB node;

Step 2, the base station sends the F1 message to the IAB donor through an X2 message.

By means of the technical solution, the problem in the related art of lacking a scheme applicable to new wireless transmission of IAB control plane information is solved, and the forwarding of control plane information between an IAB node and an IAB donor is realized in time and precisely.

In an embodiment, the X2 message and/or the F1 message comprises one of the following information: node identification information of a source node and identification information of a target node.

According to another embodiment of the present disclosure, also provided is an information transmission method, which comprises the following step:

Step 1, an IAB donor sends an F1 message to a base station through an X2 message, wherein the F1 message is sent to an IAB node via the base station.

By means of the technical solution provided by this embodiment, the problem of lacking an IAB control plane information transmission scheme applicable to the NR is solved, and the forwarding of control plane information between an IAB node and an IAB donor is realized timely and accurately.

In an embodiment, the X2 message and/or the F1 message comprises at least one of the following information: node identification information of a source node, and node identification information about a target node.

According to another embodiment of the present disclosure, also provided is an information transmission method, which comprises the following steps:

Step 1, a base station receives an F1 message sent by an IAB donor through an X2 message; and Step 2, the base station sends the F1 message to the IAB node. By means of the technical solution, the problem in the related art of lacking a scheme applicable to new wireless transmission of IAB control plane information is solved, and the forwarding of control plane information between an IAB node and an IAB donor is realized in time and precisely.

In an embodiment, the base station sends an F1 message to an IAB node, comprising at least one of the following: the base station includes the F1 message in a first RRC message, and sends the first RRC message to the IAB node; the base station sends an F1 message to the IAB node through an SRB.

In an embodiment, at least one of the F1 message, the first RRC message and/or the X2 message comprises at least one of the following information: node identification information of a source node, and node identification information of a target node.

According to another embodiment of the present disclosure, also provided is an information transmission method, which comprises the following steps:

Step 1, an IAB carries an F1 message in a second RRC message;

Step 2, the second RRC message is carried in a third RRC message; and

Step 3, the third RRC message is sent to the base station, and the second RRC message is sent to the IAB donor through the base station.

By means of the technical solution, the problem in the related art of lacking a scheme applicable to new wireless transmission of IAB control plane information is solved, and the forwarding of control plane information between an IAB node and an IAB donor is realized in time and precisely.

In an embodiment of the present disclosure, at least one of the F1 message, the second RRC message and the third RRC message satisfies the following features: comprising at least one piece of the following information: node identification information of a source node, and node identification information of a target node.

According to another embodiment of the present disclosure, an information transmission method is further provided, and the method comprises the following steps:

Step 1, a base station receives a third RRC message sent by an IAB node, wherein the third RRC message carries a second RRC message, and the second RRC message carries an F1 message; and Step 2, the second RRC message is sent to the IAB donor through an X2 message.

By means of the technical solution provided by the embodiments of the present disclosure, the problem in the related art of lacking a scheme applicable to new wireless transmission of IAB control plane information is solved, and the forwarding of control plane information between an IAB node and an IAB donor is realized in time and precisely.

In an embodiment of the present disclosure, at least one of the F1 message, the second RRC message, the third RRC message and the X2 message satisfies the following features: comprising at least one piece of the following information: node identification information about a source node and node identification information about a target node.

According to another embodiment of the present disclosure, also provided is an information transmission method, which comprises the following step:

Step 1, an IAB donor sends a second RRC message to a base station through an X2 message, wherein the second RRC message carries an F1 message, and a third RRC message carrying the second RRC message is sent to an IAB node via the base station.

By means of the technical solution provided by the embodiments of the present disclosure, the problem in the related art of lacking a scheme applicable to new wireless transmission of IAB control plane information is solved, and the forwarding of control plane information between an IAB node and an IAB donor is realized in time and precisely.

In an embodiment of the present disclosure, at least one of the F1 message, the second RRC message and the third RRC message and the X2 message satisfies the following features: containing at least one of the following information: node identification information about a source node and node identification information about a target node.

According to another embodiment of the present disclosure, an information transmission method is provided, and the method comprises the following steps:

Step 1, a base station receives a second RRC message sent by an IAB donor through an X2 message, wherein the second RRC message carries an F1 message; and Step 2, the base station sends a third RRC message to the IAB node, wherein the third RRC message carries the second RRC message.

By means of the technical solution, the problem in the related art of lacking a scheme applicable to new wireless transmission of IAB control plane information is solved, and the forwarding of control plane information between an IAB node and an IAB donor is realized in time and precisely.

Description will be given below with reference to another embodiment of the present disclosure.

Figure 4:
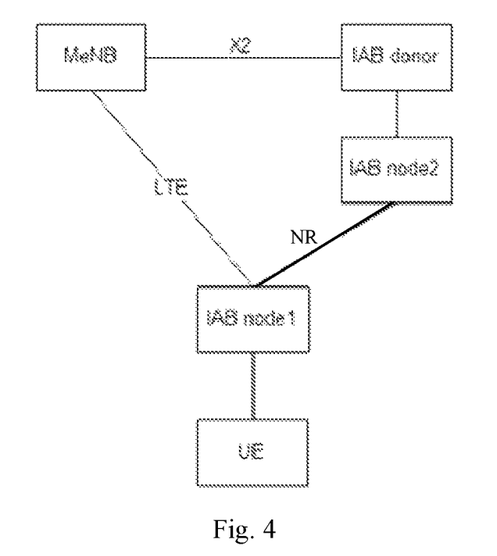
FIG. 4 is a schematic diagram of a scenario where an IAB node is accessed in an EN-DC mode according to the present disclosure.

FIG. 4 is a schematic diagram of a scenario where an IAB node is accessed by means of E-UTRAN NR Dual Connectivity (EN-DC) according to the present disclosure, a UE is connected to an IAB node 1, the IAB node 1 is connected to a MeNB (or referred to as eNB) by means of an LTE access technology, and is connected to an IAB node 2 and an IAB donor by means of an NR access technology, wherein the IAB donor is an IAB donor CU and/or an IAB donor DU.

Example 1

Figure 5:
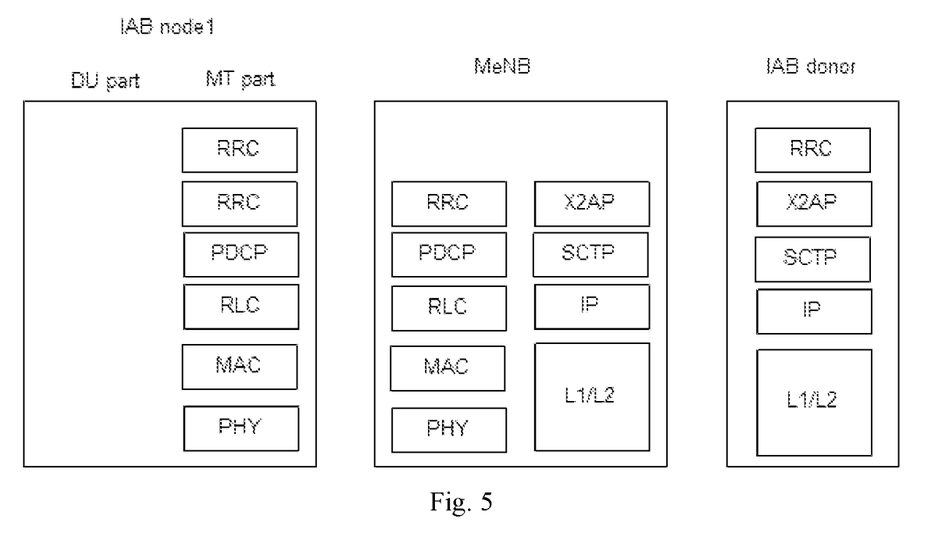
FIG. 5 is a schematic diagram of a protocol stack according to Example 1 of the present disclosure.

The method in this embodiment is a method for forwarding an RRC message of an IAB node through a base station, and FIG. 5 is a schematic diagram of a protocol stack according to Example 1 of the present disclosure.

As shown in FIG. 5, for the uplink, the IAB node1 generates an RRC message 1, encapsulates the RRC message 1 into an RRC message 2 (e. g., an UL Information Transfer MRDC message), and sends it to the MeNB. The MeNB parses the RRC message 1 generated by the IAB node1 after receiving same, and encapsulates the RRC message 1 into an X2 message (for example, an RRC transfer message), and sends same to the IAB donor.

In an embodiment of the present disclosure, the RRC message 1, RRC message 2, or X2 message includes the source node identifier information and/or target node identifier information. The node identification information is used for identifying an IAB node, or a DU part or a CU part of an IAB donor, or a base station, and the node identification information includes, but is not limited to, a gNB-DU ID, a base station identifier, a DU identifier, a CU identifier, a cell identifier, a PCI, and a newly defined identifier. In an embodiment, the node identification information is used for identifying the MT part of the IAB node or the IAB donor, and the node identification information includes, but is not limited to: C-RNTI, C-RNTI+cell identity, C-RNTI+base station identity, C-RNTI+DU identification, C-RNTI+CU identity, F1AP ID, X2 AP ID, GTP TEID, a newly defined identifier. In the transmission scenario of the uplink RRC message in this embodiment, the source node refers to the IAB node1, and the target node refers to the IAB donor.

As shown in FIG. 5, for the downlink, the IAB donor generates an RRC message 3, encapsulates the RRC message 3 in an X2 message (e. g., an RRC transfer message), and sends the message to the MeNB. After analyzing the received RRC message 3, the MeNB encapsulates the RRC message 3 into an RRC message 4 (such as DL Information Transfer MRDC message, DL Information Transfer message, or newly defined RRC message) and sends the RRC message 4 to the IAB node1.

In an embodiment of the present disclosure, the RRC message 3, RRC message 4, or X2 message includes the source node identifier information and/or target node identifier information. The node identification information is configured to identify the IAB node, or the DU part or CU part of the IAB donor, or a base station. The node identification information includes, but not limited to: a NB-DU ID, a base station identifier, a DU identifier, a CU identifier, a cell identifier, a PCI, and a newly defined identifier. In another embodiment, the node identification information is used to identify the MT part of the IAB node or the IAB donor, and the node identification include but not limited to: C-RNTI, C-RNTI+cell identity, C-RNTI+base station identity, C-RNTI+DU identification, C-RNTI+CU identity, F1AP ID, X2 AP ID, GTP TEID, and a newly defined identifier. In the transmission scenario of the downlink RRC message in this embodiment, the source node refers to the IAB donor, and the target node refers to the IAB node1.

Example 2

Figure 6:
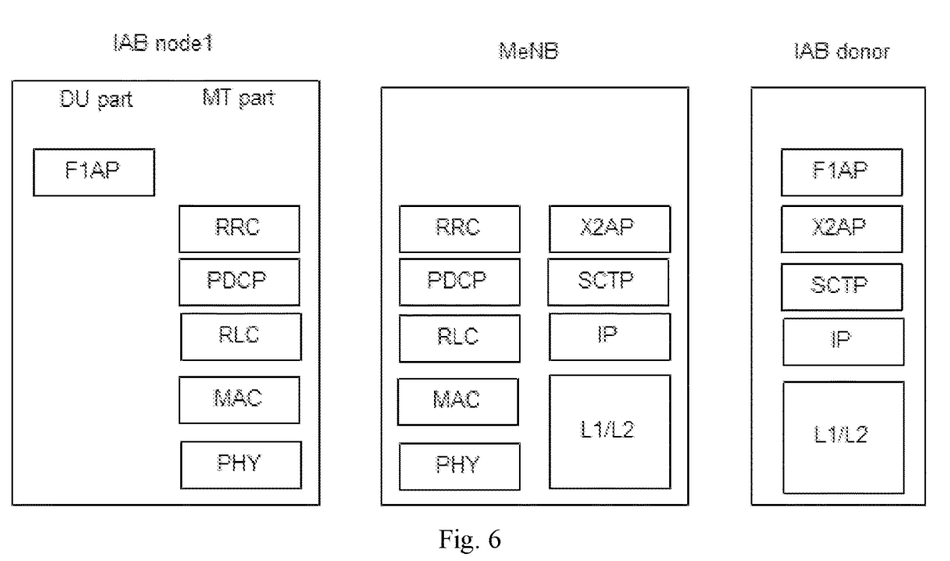
FIG. 6 is a schematic diagram of a protocol stack according to Example 2 of the present disclosure.

The method in this embodiment is a first method for forwarding an F1 message of an IAB node through a base station. FIG. 6 is a schematic diagram of a protocol stack according to Example 2 of the present disclosure. It should be noted that there may or may not be an RRC protocol layer between the IAB node 1 and the MeNB in FIG. 6.

As shown in FIG. 6, for the uplink, after generating an F1 message, the IAB node1 encapsulates the F1 message into an RRC message 1 (e. g., a UL information transfer message, a newly defined RRC message); In an embodiment, the IAB node1 delivers the F1 message directly to the PDCP layer without being processed by the RRC layer. In an embodiment, the IAB node1 is sent to the MeNB through an SRB dedicated to forwarding the F1 message; In an embodiment, the IAB node1 obtains bearer configuration information from the donor CU via an RRC message or an F1 message, wherein the bearer configuration information is used for configuring an SRB dedicated to forwarding an F1 message, and may contain an SRB ID and associated indication information for forwarding the F1 message, or may implicitly indicate, via the SRB ID, that the associated bearer is used for forwarding the F1 message; or the IAB node1 performs PDCP layer processing, and carries protocol type indication information through a PDCP data packet for indicating that it bears an F1 message.

The IAB node1 sends the F1 message to the MeNB through the SRB. The MeNB parses the corresponding protocol layer to obtain the F1 message generated by the IAB node1. The F1 message is then encapsulated into an X2 message (e. g., a F1AP message transfer message, a newly defined X2 message) and sent to the IAB donor.

In an embodiment, the F1 message or the RRC message or the X2 message includes the identification information of the source node and/or the target node. The node identification information is used for identifying an IAB node, or a DU part or a CU part of an IAB donor, or a base station, and the node identification information include, but is not limited to, a gNB-DU ID, a base station identifier, a DU identifier, a CU identifier, a cell identifier, a PCI, and a newly defined identifier. In an embodiment, the node identification information is used for identifying the MT part of the IAB node or the IAB donor, and the node identification information include, but is not limited to: C-RNTI; C-RNTI+cell identity, C-RNTI+base station identity, C-RNTI+DU identification, C-RNTI+CU identity, F1AP ID, X2 AP ID, GTP TEID, a newly defined identifier. in the scenario of transmitting an uplink F1 message in this embodiment, the source node refers to the IAB node1, and the target node refers to the IAB donor.

As shown in FIG. 6, for downlink, after generating an F1 message, the IAB donor encapsulates the F1 message in an X2 message (e. g., F1AP message transfer message, newly defined X2 message) and sends the X2 message to the MeNB. The MeNB acquires the F1 message after parsing. The MeNB then encapsulates the F1 message into an RRC message (e. g., a UL information transfer message, a newly defined RRC message) and sends it to the IAB node1. In an embodiment, the MeNB does not encapsulate the F1 message into an RRC message, but directly submits the F1 message to the PDCP layer for processing, and sends the F1 message to the IAB node1 through the SRB. In an embodiment, the MeNB sends to the IAB node1 or the MeNB through an SRB dedicated to forwarding an F1 message for PDCP layer processing, and carries protocol type indication information through a PDCP data packet for indicating that it bears an F1 message.

In an embodiment, the F1 message or the RRC message or the X2 message includes the identification information of the source node and/or the identification information of the target node. The node identification information is used for identifying the IAB node, or the DU part or the CU part of the IAB donor, or a base station, and the node identification information include but not limited to: a NB-DU ID, a base station identifier, a DU identifier, a CU identifier, a cell identifier, a PCI, and a newly defined identifier. In an embodiment, the node identification information is used for identifying the MT part of the IAB node or the IAB donor, and the node identification information include, but not limited to: C-RNTI, C-RNTI+cell identity, C-RNTI+base station identity, C-RNTI+DU identification, C-RNTI+CU identity, FLAP ID; X2 AP ID, GTP TEID, a newly defined identifier. In this embodiment, in a scenario of transmitting a downlink F1 message, a source node refers to an IAB donor, and a target node refers to an IAB node1.

Example 3

Figure 7:
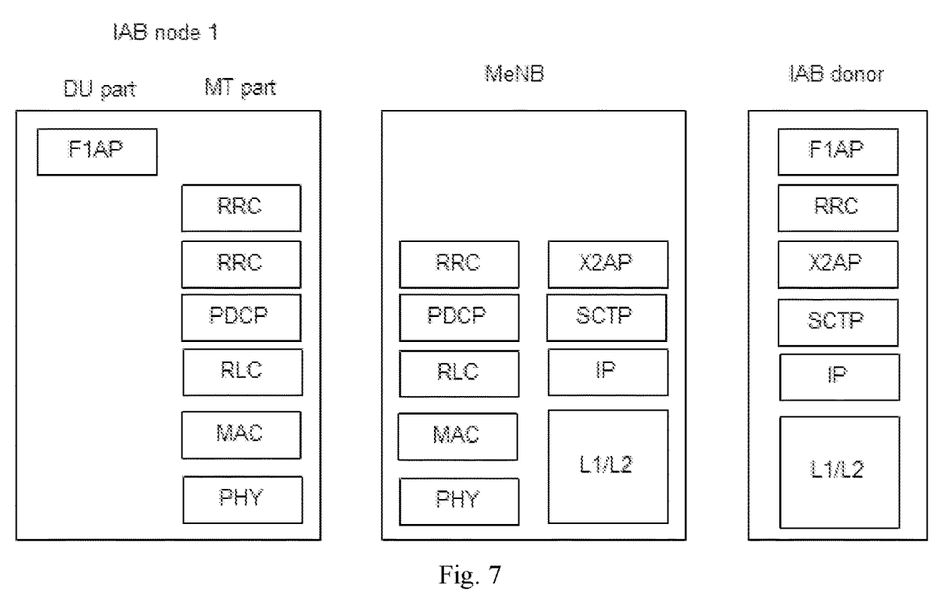
FIG. 7 is a schematic diagram of a protocol stack according to Example 3 of the present disclosure.

The method in this embodiment is a second method for forwarding an F1 message of an IAB node through a base station. FIG. 7 is a schematic diagram of a protocol stack according to Example 3 of the present disclosure.

As shown in FIG. 7, for the uplink, the IAB node1 generates an F1 message, and encapsulates the F1 message into the RRC message 1. The IAB node1 then encapsulates RRC message 1 into RRC message 2 (e. g., an UL Information Transfer MRDC message) and sends it to the MeNB. The MeNB parses the RRC message 1 generated by the IAB node1 after receiving same, encapsulates the RRC message 1 into an X2 message (for example, an RRC transfer message), and sends it to the IAB donor.

In an embodiment, the RRC message 1, RRC message 2, or X2 message includes the source node identifier information and/or target node identifier information. The node identification information is used for identifying the DU part or the CU part of the IAB node or the IAB donor, or the base station, and the node identifier information include, but not limited to: a gNB-DU ID, a base station identifier, a DU identifier, a CU identifier, a cell identifier, a PCI, and a newly defined identifier. In an embodiment, the node identification information is used for identifying the MT part of the IAB node or the IAB donor, and node identifier information include, but is not limited to: C-RNTI; C-RNTI+cell identity, C-RNTI+base station identity, C-RNTI+DU identification, C-RNTI+CU identity, F1AP ID, X2 AP ID, GTP TEID, a newly defined identifier. In the scenario of transmitting an uplink F1 message in this embodiment, the source node refers to the IAB node1, and the target node refers to the IAB donor.

As shown in FIG. 7, for downlink, the IAB donor generates an F1 message, and encapsulates the F1 message into an RRC message 3. The IAB donor then encapsulates RRC message 3 in an X2 message (e. g., RRC transfer message) and sends it to the MeNB. The MeNB parses the message to obtain the RRC message 3, encapsulates the RRC message 3 in an RRC message 4 (for example, a DL Information Transfer MRDC message, a DL Information Transfer message or a newly defined RRC message), and sends same to the IAB node1.

In an embodiment, the RRC message 3, RRC message 4, or X2 message includes the source node identifier information and/or target node identifier information. The node identification information is used for identifying a DU part or a CU part of an IAB node or an IAB donor, or a base station, and node the identifier information include, but is not limited to, a gNB-DU ID, a base station identifier, a DU identifier, a CU identifier, a cell identifier, a PCI, and a newly defined identifier. In an embodiment, the node identification information is used for identifying the MT part of the IAB donor or the IAB node, and the node identification information include, but is not limited to: C-RNTI, C-RNTI+cell identity, C-RNTI+base station identity, C-RNTI+DU identification, C-RNTI+CU identity, F1AP ID, X2 AP ID, GTP TEID, a newly defined identifier. In this embodiment, in a scenario of transmitting a downlink F1 message, a source node refers to an IAB donor, and a target node refers to an IAB node1.

Through the description of the foregoing embodiments, a person skilled in the art may clearly understand that the method according to the foregoing embodiments may be implemented by software in addition to a necessary universal hardware platform, and definitely may also be implemented by hardware. However, in many cases, the former is a preferred implementation. Based on such understanding, The essence of the technical solutions of the present disclosure or the part contributing to the relevant art may be embodied in the form of a software product, the computer software product is stored in a storage medium (such as a ROM/RAM, a magnetic disk and an optical disk), the software product includes several instructions for instructing a terminal device (which may be a mobile phone, a computer, a server, or a network device) to execute the methods described in the embodiments of the present disclosure.

Embodiment 2

In an embodiment of the present disclosure, an information transmission device is further provided, the device is used to implement the above described embodiments and examples, and what has been described will not be elaborated. The term "module", as used hereinafter, is a combination of software and/or hardware capable of realizing a predetermined function. Although the device described in the following embodiment is preferably implemented by software, implementation of hardware or a combination of software and hardware is also possible and conceived.

According to an embodiment of the present disclosure, an information transmission device applied to an IAB node is provided. The device comprises a first sending module, and the first sending module is configured to send an F1 message to a base station, wherein the F1 message is forwarded to an IAB donor via the base station.

According to an embodiment of the present disclosure, an information transmission device applied to a base station is provided. The device comprises a second receiving module and a second sending module. The second receiving module is configured to receive an F1 message sent by an IAB, and the second sending module is configured to send the F1 message to the IAB donor through an X2 message.

According to an embodiment of the present disclosure, an information transmission device applied to an IAB donor is provided. The device comprises a third sending module, and the third sending module is configured to send an F1 message to a base station through an X2 message, wherein the F1 message is sent to an IAB node via the base station.

According to an embodiment of the present disclosure, an information transmission device applied to a base station is provided. The device comprises a fourth receiving module and a fourth sending component. The fourth receiving module is configured to receive an F1 message sent by an IAB donor through an X2 message, and the fourth sending component is configured to send the F1 message to the IAB node.

According to an embodiment of the present disclosure, an information transmission device applied to an IAB node is provided. The device comprises a fifth processing module and a fifth sending module. The fifth processing module is configured to carry an F1 message in a second RRC message, and carry the second RRC message in a third RRC message. The fifth sending module, configured to send the third RRC message to the base station, and send the second RRC message to the IAB donor via the base station.

According to an embodiment of the present disclosure, an information transmission device applied to a base station is provided. The device comprises a sixth receiving module and a sixth sending module. The sixth receiving module is configured to receive a third RRC message sent by the IAB node, wherein the third RRC message carries a second RRC message, and the second RRC message carries an F1 message. The sixth sending module is configured to send the second RRC message to the IAB donor through an X2 message.

According to an embodiment of the present disclosure, an information transmission device applied to a Integrated Access and Backhaul IAB donor is provided. The device comprises a seventh sending module, and the seventh sending module is configured to send a second RRC message to a base station through an X2 message, wherein the second RRC message contains an F1 message, and a third RRC message carrying the second RRC message is sent to an IAB node via the base station.

According to an embodiment of the present disclosure, an information transmission device applied to a base station is provided. The device comprises an eighth receiving module and an eighth sending module. The eighth receiving module is configured to receive a second RRC message sent by the IAB donor through an X2 message, wherein the second RRC message contains an F1 message. The eighth sending module is configured to send a third RRC message to the IAB node, wherein the third RRC message contains the second RRC message.

It should be noted that each module may be implemented by software or hardware. The latter may be implemented in the following manner, but is not limited thereto. All the modules are located in a same processor; in an embodiment, the modules are located in different processors in an arbitrary combination.

Embodiment 3

An embodiment of the present disclosure further provides a storage medium. In this embodiment, the storage medium is configured to store computer program for executing the following steps:

S1, an IAB node determines an F1 message to be transmitted; and

S2, the IAB node sends the F1 message a base station, wherein the F1 message is forwarded to an IAB donor via the base station.

In an embodiment, in this embodiment, the storage medium may include, but is not limited to, any medium that can store program codes, such as a USB flash disk, a read-only memory (ROM), a random access memory (RAM), a removable hard disk, a magnetic disk, or an optical disk.

An embodiment of the present disclosure further provides an electronic device, and the electronic device comprises a memory and a processor, wherein the memory stores a computer program, and the processor is configured to run the computer program so as to execute the steps in any one of the method embodiments.

In an embodiment, the electronic device can further comprise a transmission device and an input/output device, wherein the transmission device is connected to the processor, and the input/output device is connected to the processor.

In an embodiment, in this embodiment, the processor may be arranged to execute the following steps by means of a computer program:

S1, an IAB node determines an F1 message to be transmitted; and

S2, the IAB node sends the F1 message to a base station, wherein the F1 message is forwarded to an IAB donor via the base station.

In an embodiment, for specific examples in this embodiment, reference may be made to the examples described in the foregoing embodiments and optional implementations, and details are not repeatedly described herein in this embodiment.

Obviously, those skilled in the art should understand that, the above-mentioned modules or steps of the present disclosure can be implemented by a general computing device, they may be centralized on a single computing device or distributed across a network of multiple computing devices. In an embodiment, they can be realized by using executable program codes of the calculation devices. Thus, they can be stored in a storage device and executed by the computing device, and in some cases. The shown or described steps may be executed in an order different from that described here, or they are made into each integrated circuit module respectively, or a plurality of modules or steps therein are made into a single integrated circuit module for implementation. Thus, the present disclosure is not limited to any particular combination of hardware and software.

The foregoing descriptions are merely Examples of the present disclosure, but are not intended to limit the present disclosure. For those skilled in the art, the present disclosure may have various modifications and variations. Any modifications, equivalent replacements, improvements and the like made within the spirit and principle of the present disclosure shall belong to the scope of protection of the present disclosure.

INDUSTRIAL APPLICABILITY

In the embodiments of the present disclosure, an IAB node sends an F1 message to a base station, and the base station forwards the F1 message to an IAB donor. The problem of lacking an IAB control plane information transmission scheme applicable to the NR is solved, and the forwarding of control plane information between an IAB node and an IAB donor is realized timely and accurately.

What is claimed is:

1. An information transmission method, comprising:
   sending, by an Integrated Access and Backhaul (IAB) node, an F1 message to a base station;
   receiving, by the base station, the F1 message sent by the IAB node; and
   sending, by the base station, the F1 message to the IAB donor through an X2 message;
   wherein sending an 1 message from an IAB node to a base station comprises at least one of:
   carrying, by the IAB node, the F1 message in a first Radio Resource Control (RRC) message and sending the first RRC message to the base station; and
   sending, by the IAB node, the F1 message to the base station via a signaling radio bearer (SRB).

2. The method as claimed in claim 1, wherein the F1 message and/or the first RRC message satisfies the following characteristics:
   comprising at least one of the following information: node identification information of a source node, and node identification information of a target node.

3. The method as claimed in claim 2, wherein the node identification information identifies one of:
   a distributed unit (DU) of the IAB node;
   a base station part of the IAB node;
   a distributed unit (DU) of the IAB donor;
   a centralized unit (CU) of the IAB donor;
   a base station part of the IAB donor.

4. An electronic device, comprising a memory and a processor, wherein the memory stores a computer program, and the processor is configured to run the computer program so as to execute the method as claimed in claim 3.

5. The method as claimed in claim 2, wherein the node identification information is used for identifying the following information:
   a mobile terminal (MT) part of the IAB node.

6. An electronic device, comprising a memory and a processor, wherein the memory stores a computer program, and the processor is configured to run the computer program so as to execute the method as claimed in claim 5.

7. An electronic device, comprising a memory and a processor, wherein the memory stores a computer program, and the processor is configured to run the computer program so as to execute the method as claimed in claim 2.

8. The method as claimed in claim 1, wherein the X2 message and/or the F1 message satisfies the following characteristics:
   comprising one of the following information: node identification information of a source node, and identification information of a target node.

9. A non-transitory storage medium, wherein the storage medium stores a computer program, wherein the computer program is configured to run to execute the method as claimed in claim 1.

10. An electronic device, comprising a memory and a processor, wherein the memory stores a computer program, and the processor is configured to run the computer program so as to execute the method as claimed in claim 1.

11. An information transmission method, comprising:
    sending, by an Integrated Access and Backhaul (IAB) donor, an F1 message to a base station through an X2 message;
    receiving, by the base station, the F1 message sent by the IAB donor; and
    sending, by the base station, the F1 message to an IAB node;
    wherein sending, by the base station, the F1 message to the IAB node comprises at least one of:
    carrying, by the base station, the F1 message in a first Radio Resource Control (RRC) message, and sending the first RRC message to the IAB node; and
    sending, by the base station, the F1 message to the IAB node through a Signaling Radio Bearer (SRB).

12. The method as claimed in claim 11, wherein the X2 message and/or the F1 message satisfies the following characteristics:
    comprising at least one of the following information: node identification information of a source node, node identification information of a target node.

13. The method as claimed in claim 11, wherein at least one of the F1 message, the first RRC message and the X2 message satisfies the following characteristics:
    comprising at least one of the following information: node identification information of a source node, and node identification information of a target node.

14. An information transmission system, comprising:
    an Integrated Access and Backhaul (IAB) node, configured to send an F1 message to a base station;
    the base station, configured to receive the F1 message sent by the IAB node, and send the F1 message to the IAB donor through an X2 message;
    wherein the F1 message is sent from the IAB node to the base station in at least one of the following ways:
    the F1 message is carried in a first RRC message, and the first Radio Resource Control (RRC) message is sent to the base station; and
    the F1 message is sent to the base station via a signaling radio bearer (SRB).

* * * * *